United States Patent Office 2,769,796
Patented Nov. 6, 1956

2,769,796

MELAMINE-FORMALDEHYDE-POLYAMINE CONDENSATION PRODUCT

Tzeng Jiueq Suen, New Canaan, and Yun Jen, Stamford, Conn., assignors to American Cyanamid Company, New York, N. Y., a corporation of Maine No Drawing. Application March 20, 1953, Serial No. 343,792

21 Claims. (Cl. 260—45.2)

This invention relates to resinous compositions and to the process of preparing the same. More particularly this invention relates to the production of resinous compositions which comprise reacting melamine, formaldehyde and a polyfunctional aliphatic polyamine condensation product.

Melamine-formaldehyde resinous compositions are well-known in the art. Resinous compositions comprising solely melamine and formaldehyde as well as those compositions containing melamine, formaldehyde and a modifying component find many uses. The use of melamine resins in making a wet strength paper has been known for a number of years. One of the usual practices is to dissolve the melamine-formaldehyde resin in a dilute hydrochloric acid solution and age it for a certain length of time. During this period the resin is further polymerized and the so-called acid colloid is formed. The acid colloid is infinitely water-soluble and is a very effective beater additive for paper. However, it is not stable and must be prepared by this aging process just prior to use.

Besides the acid colloids other forms of water-soluble melamine resins are known; for instance, methylated polymethylol melamine and bisulfite modified melamine-formaldehyde resin. The methylated product has a low degree of polymerization and is not generally effective as a beater additive although it finds other uses in such applications as in textile treatment and laminating processes. The bisulfite modified product while far inferior to the acid colloid finds some use in making wet strength paper.

We have found by reacting melamine-formaldehyde and a water-soluble polyfunctional aliphatic polyamine condensation product in the presence of an acid that stable, water-soluble but highly polymerized products are obtained which can be added directly to the pulp stock as an efficient wet strengthening agent for paper through beater addition. The resinous composition prepared can also be used in textile treatment and in leather treatment. Other uses such as for a water-soluble adhesive and as an insolubilizing agent to starch are possible.

It is an object of this invention to produce a water-soluble resinous material. It is a further object of this invention to prepare a resinous material comprising melamine, formaldehyde and a polyfunctional aliphatic polyamine condensation product. These and other objects of our invention will be discussed more fully hereinbelow.

In the preparation of the resinous material the order of addition of reactants is not important. For instance, melamine and formaldehyde can be condensed first at neutral or slightly alkaline pH. Thereafter the modifier is added and the mixture subsequently acidified. Polymerization proceeds rapidly in an acidic medium. As soon as the desired degree of polymerization is reached, the polymerization reaction is halted by neutralization of the reaction mixture. Alternately, the modifier can be first reacted with formaldehyde then melamine charged into the reaction mixture. Still another way of preparation is to charge melamine, formaldehyde and the modifier all together at a pH in the order of from about 4.5 to about 6.5 and the polymerization carried out to the end. The end point of the polymerization is best controlled by viscosity measurement of the resin syrup. At 35% resin solids a minimum viscosity of 20 centipoises measured at 25° C. must be reached before the reaction is stopped. There is no upper viscosity limit to which the resin should be polymerized but for practical purposes a viscosity at 25° C. about 800 centipoises at 35% solids has been found to unduly shorten the storage life of the resin. The preferred viscosity range of the finished syrup measured at 25° C. and at 35% solids is from about 30 to about 500 centipoises. Furthermore, the reactants can be added in portion at different points of reaction, for example, a part of formaldehyde can be first reacted with melamine, the modifier charged, and the remaining formaldehyde added after the reaction mass has been highly polymerized.

Generally the lower the pH of the reaction mixture the faster is the rate of reaction. We have found that the reaction can be carried out at a pH range of from about 1 to about 10 with the preferred range being from 2 to 7. The most suitable pH, however, depends on the particular compositions used. In general with a greater amount of formaldehyde a lower pH should be used. With the polyfunctional aliphatic polyamine condensation product in the reaction mass a lower pH may be used.

Temperature of reaction can be in the range of from room temperature up to the reflux temperature of the mix. If an autoclave is used in carrying out the reaction, even higher temperatures may be employed. The preferred temperature range is from about 20° C. to about 100° C. at atmosphere pressure.

In order that those skilled in the art may more fully understand our inventive concept the following examples are set forth for purposes of illustration only, unless otherwise indicated in the appended claims. All parts used are parts by weight.

*Example 1*

63 parts of melamine, 203 parts of formalin (37% aqueous formaldehyde) and 1 part triethanolamine are charged into a suitable reactor equipped with agitating, heating, cooling, and refluxing devices. The pH of the slurry is 7.6. The mixture is heated to 75° C. and maintained at this temperature for 25 minutes. A polyfunctional aliphatic polyamine condensation product obtained by reacting triethylene tetramine with epichlorohydrin is added. The pH of the reaction mixture drops to 5.7. Reaction is allowed to continue at a temperature between 65 and 70° C. for about 10 minutes until the viscosity of the syrup reaches G on the Gardner Holdt scale. The syrup is neutralized with 20% sodium hydroxide solution and diluted with equal weight of formalin. Product is stable and completely soluble in water.

*Example 2*

63 parts of melamine and 284 parts of formalin (37% aqueous formaldehyde) are mixd together and the pH of the slurry is adjusted to 7.6 with triethanolamine. The mixture is heated to 75° C. and maintained at this temperature for 25 minutes. A polyfunctional aliphatic polyamine obtained by reacting ethylene tetramine and epichlorohydrin is added followed by 105 parts of formalin. The pH of the reaction mixture is lowered to 3.3 by adding 18% hydrochloric acid. Reaction is allowed to proceed at a temperature in the range of 60 to 65° C. while the viscosity of the syrup rapidly increases. When the viscosity of P on the Gardner Holdt scale is reached, the reaction is stopped by raising the pH of the mixture to about 7.5 with sodium hydroxide solution. To the neutralized syrup is then introduced an additional 225 parts of formalin. The product is stable and infinitely water-soluble.

*Example 3*

126 parts of melamine and 810 parts of formalin (37% aqueous formaldehyde) are introduced into a suitable reaction vessel. The pH of the slurry is adjusted to 7.5 with 20% sodium hydroxide solution. The mixture is heated to 75° C. and maintained at this temperature for 20 minutes. 240 parts of a 40% solution of a polyfunctional aliphatic polyamine condensation product of ammonia and glycerin-dichlorohydrin is then added. The pH of the mixture is then adjusted with hydrochloric acid immediately to 3.0. Temperature of reaction is held at 70° C. throughout the entire acidic stage reaction while the syrup viscosity increases steadily as the reaction proceeds. When the syrup reaches a Gardner Holdt viscosity of E at 25° C. it is neutralized with 20% sodium hydroxide solution to a pH of 7.0. The resin syrup contains about 26% solids.

In the practice of the process of our invention it is desirable to use an excess amount of formaldehyde in the reaction mixture. The molar ratio of formaldehyde to melamine should always be greater than 6 to 1 and while no actual upper limit on the molar ratio of formaldehyde to melamine is known a practical upper limit will necessarily be reached. It is preferred that from about 8 mols of formaldehyde per mol of melamine to about 20 mols of formaldehyde per mol of melamine be employed in the preparation of the resinous product. The maximum theoretical mols of formaldehyde that may react with each mol of melamine is 6 to 1. Although the reaction mechanism of the formation of the resin of our invention has not been established, we believe that the excess formaldehyde present in the reaction mass reacts with some of the methylol groups of the resins to form hemi-acetals. This reaction is in accordance with that when a simple alcohol is reacted with formaldehyde. The hemi-acetals formed are comparatively unstable and are the results of reversible reactions and exist only in the form of solutions. Under neutral or alkaline conditions the hemi-acetals appear to be the sole reaction product between formaldehyde and the methylol groups of the resin. Under acidic conditions the hemi-acetals that are first formed are capable of reacting with additional quantities of the methylol groups to yield formaldehyde-acetals or formals. The formation of hemi-acetals or formals seems to improve the solubility as well as the storage stability of the resin syrup.

We have found that by reacting a polyfunctional aliphatic polyamine condensation product with these melamine formaldehyde reaction products a water soluble resinous composition of a high degree of polymerization is obtained. The polyfunctional aliphatic polyamine condensation product may be obtained as a reaction product selected from the group consisting of difunctional halohydrin and ammonia; difunctional halohydrin and polyalkylene polyamine; and dihaloalkane and polyalkylene polyamine. The polyfunctional polyamine condensation products are obtained as set forth in the following illustrative examples. All parts employed are parts by weight and should not be considered critical unless otherwise noted in the appended claims.

*Example 4*

An ammonia epichlorohydrin condensation product was prepared as follows:

533 parts of aqueous ammonia solution (27% NH₃) was charged into a suitable reaction vessel. 277 parts of epichlorohydrin are added gradually thereto. The exothermic reaction is controlled at 26–29° C. Thereafter the mixture is heated on a steam bath for 1 to 2 hours. The reaction product is then cooled to about 15–20° C. and 240 parts of a 50% solution of sodium hydroxide is added and allowed to stand for 15 minutes. The reaction mixture is then diluted to about 40% solids content by the addition of the required amount of water.

Difunctional halohydrin polyalkylene polyamine condensation products are prepared as set forth in Examples 5 and 6.

*Example 5*

1701 parts of tetraethylene pentamine is dissolved in 1800 parts of water in a suitable vessel with stirring. Heat is liberated and the solution cooled to 20° C. 1832.5 parts of epichlorohydrin are slowly added to this cool solution over a period of 1½ hours during which time the reaction vessel is intermittently cooled in order to prevent the temperature from rising above 30° C. After the addition is complete, the reaction mixture is allowed to heat spontaneously and the temperature arises to a maximum of about 49° C. at the end of 2 hours. After an additional 1½ hours, the temperature falls to 43° C. and the solution is then heated with steam for 4 hours at 95–96° C. Upon cooling, the product is a light red color, clear, viscous syrup.

*Example 6*

25 parts of water are added to 47 parts of tetraethylene pentamine and the mixture is cooled to about 3° C. 80 parts of glycerol alpha-dichlorohydrin are added dropwise over a period of 2 hours and the mixture is then allowed to warm up to room temperature over the next hour. This represents a mol ratio of about 1 to 2.9 of polyamine to halohydrin. The mixture is then heated over a steam bath gradually to 92° C. for ½ hour. The resinous mixture is then chilled to about 6° C. 12 parts of a 97% sodium hydroxide solution in water and 36 parts of water are added to the resinous mixture which is kept chilled on a cooling bath for an additional ½ hour. The cooling bath is then removed. The resin is then diluted to about 15% solids by the addition of water. This condensation product solution is now comparatively stable and can be further diluted as desired.

*Example 7*

A dihaloalkane polyalkylene polyamine condensation product was prepared as follows:

284 parts of tetraethylene pentamine was placed in a suitable reaction vessel provided with heating means and an agitator. The tetraethylene pentamine is heated to about 85° C. while 202 parts of trimethylene dibromide are added slowly while maintaining the temperature at about 85 to 90° C. After all of the trimethylene dibromide is added, the resulting viscous syrup is heated for about ½ hour more. The syrup is dissolved in 1,000 parts of water and then cooled to about 5° C. 40 parts of sodium hydroxide dissolved in 100 parts of water is then added in order to form the free base of the condensation product.

In the preparation of the condensation products set forth in Examples 4, 5, 6 and 7 above the amounts of difunctional halohydrin or dihaloalkane reacted with ammonia or polyalkylene polyamine may vary in molar ratio of from 1:3 to 3:1 respectively. The temperature of reaction maintained throughout the condensation reaction may vary from 0° C. to the reflux temperature of the mixture with the preferred temperature range being from room temperature to 60° C.

By the use of the term difunctional halohydrin we include the epihalohydrins and the dihalohydrins. Among the epihalohydrins which can be utilized with the polyalkylene polyamines or ammonia to form the reaction product for use in the process of our invention, we include epichlorohydrin, epibromohydrin, and the like. The difunctional dihalohydrins that may be utilized include such compounds as glycerol-α-dichlorohydrin, glycerol-β-dichlorohydrin, glycerol-α-dibromohydrin, glycerol-β-dibromohydrin, and the like.

The difunctional halohydrins which are used in the preparation of these condensation products are the derivatives of glycerol, in which at least one hydroxy group, preferably a terminal hydroxy group, has been substituted by a halogen atom, such as by the substitution of chlorine, iodine, bromine and the like. In the instance of a monohalohydrin substitution, it is necessary that the remaining 2 hydroxy groups be dehydrated to form an epoxy linkage.

The dihaloalkanes that may be utilized in our invention include ethylene dichloride, trimethylene dichloride, trimethylene dibromide, ethylene dibromide, trimethylene diiodide and the like. The polyalkylene polyamines which may be employed in the production of the condensation products with the dihaloalkanes or the difunctional halohydrins are such compounds as ethylene diamine, diethylene triamine, triethylene tetramine, tetraethylene pentamine, 3,3'-imino-bis-propylamine, tris-(3-aminopropyl)amine, 1,4-diamino-butane and the like.

The amount of polyfunctional aliphatic polyamine condensation product that may be employed in the preparation of the resinous material may vary over rather wide limits. The amount of the condensation product utilized is based on the number of atoms of basic nitrogen present in said product. From about 0.5 atom of basic nitrogen present in the polyfunctional aliphatic polyamine condensation product per mol of melamine to about 10 atoms of basic nitrogen present in the polyfunctional aliphatic polyamine condensation product per mol of melamine may be used. It is preferred, however, that from about 1 atom basic nitrogen to about 4 atoms basic nitrogen present in the polyfunctional aliphatic polyamine condensation product be utilized per mol of melamine present. The particular polyfunctional aliphatic polyamine condensation product should be so selected that the carbon to nitrogen ratio present is not greater than 4:1. We have found that a carbon to nitrogen ratio greater than this is detrimental to the water solubility of the resinous product.

Three of the resins prepared as set forth above were tested as wet strength paper resins. Hand sheets were made on a Nash paper machine with Canadian bleached kraft pulp beaten to a Green freeness of about 500. The solids content of the syrup is determined by the Plastic Materials Manufacturers Association method. The amount of resin applied is either 1 part or 3 parts of resin solids per 100 parts of dry pulp. 1 part of alum is also added. The pH of the pulp slurry is adjusted to 4.5. After the hand sheets are made, they are dried at 220–240° F. for 2 minutes. The test results are set forth in the table below.

TABLE 1

| Resin Described in— | Percent Resin Applied | Basis Wt. 25" x 40" x 500, Lbs. | Wet Tensile, Lbs./In. |
| --- | --- | --- | --- |
| Ex. 1 | 1 | 46.5 | 5.4 |
| Ex. 2 | 1 | 46.9 | 6.2 |
| Ex. 3 | 1 | 47.5 | 6.0 |
| Blank | None | 47.5 | 0.5 |

Attention is directed to our copending application Serial No. 343,791, filed concurrently herewith, wherein resinous compositions and process of preparing same which comprises reacting melamine, formaldehyde and a polyfunctional aliphatic polyamine is disclosed and claimed.

We claim:

1. The process of preparing a water-soluble resinous material which comprises reacting melamine, formaldehyde and the condensation product of 3,3'-iminobispropylamine and epichlorohydrin at a temperature between about 20° C. and about 100° C. until a viscosity of between about 20 centipoises and about 800 centipoises measured at 35% solids and at 25° C. is obtained, thereafter neutralizing said resinous material, wherein the formaldehyde is present in an amount between about 8 mols and about 20 mols per mol of melamine and the condensation product of 3,3'-iminobispropylamine and epichlorohydrin is present in an amount sufficient to yield between about 1 and about 4 atoms of nitrogen per mol of melamine and wherein the product produced is infinitely dilutable in neutralized water at a temperature between about 25° C. and 30° C.

2. The process of preparing a water-soluble resinous material which comprises reacting melamine, formaldehyde and a polyfunctional aliphatic polyamine condensation product selected from the group consisting of (1) ammonia and a difunctional halohydrin, (2) a polyalkylene polyamine and a difunctional halohydrin and (3) a polyalkylene polyamine and a dihaloalkane at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine, wherein said polyamine has a carbon to nitrogen ratio not greater than 4:1, respectively, and the polyfunctional aliphatic polyamine condensation product is present in an amount to yield between about 0.5 and about 10 atoms of nitrogen per mol of melamine and wherein the product produced is infinitely dilutable in neutralized water at a temperature between about 25° C. and 30° C.

3. The process of preparing a water soluble resinous material which comprises reacting melamine, formaldehyde and a polyfunctional aliphatic polyamine condensation product selected from the group consisting of (1) ammonia and a difunctional halohydrin, (2) a polyalkylene polyamine and a difunctional halohydrin and (3) a polyalkylene polyamine and a dihaloalkane at a temperature between about 20° C. and about 100° C. until a viscosity of between about 20 centipoises and about 800 centipoises measured at 35% solids and 25° C. is obtained, thereafter neutralizing said resinous material, wherein formaldehyde is present in an amount of between about 8 mols and about 20 mols per mol of melamine, wherein said polyamine has a carbon to nitrogen ratio not greater than 4:1, respectively, and the polyfunctional aliphatic polyamine condensation product is present in an amount to yield between about 1 and about 4 atoms of nitrogen per mol of melamine, and wherein the product produced is infinitely dilutable in neutralized water at a temperature between about 25° C. and 30° C.

4. The process of preparing a water-soluble resinous material which comprises reacting melamine, formaldehyde and the condensation product of ammonia and a difunctional halohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine and the condensation product of ammonia and a difunctional halohydrin is present in an amount to yield between about 0.5 and about 10 atoms of nitrogen per mol of melamine and wherein the product produced is infinitely dilutable in neutralized water at a temperature between about 25° C. and 30° C.

5. The process of preparing a water-soluble resinous material which comprises reacting melamine, formaldehyde and the condensation product of a polyalkylene polyamine and a difunctional halohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine, wherein said polyamine has a carbon to nitrogen ratio not greater than 4:1, respectively, and the condensation product of polyalkylene polyamine and difunctional halohydrin is present in an amount to yield between about 0.5 and about 10 atoms of nitrogen per mol of melamine and wherein the product produced is infinitely dilutable in neutralized water at a temperature between about 25° C. and 30° C.

6. The process of preparing a water-soluble resinous material which comprises reacting melamine, formaldehyde and a condensation product of polyalkylene polyamine and the dihaloalkane at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine, wherein said polyamine has a carbon to nitrogen ratio not greater than 4:1, respectively, and the condensation product of polyalkylene polyamine and dihaloalkane is present in an amount to yield between about 0.5 and about 10 atoms of nitrogen per mol of melamine, and wherein the product produced is infinitely dilutable in neutralized water at a temperature between about 25° C. and 30° C.

7. The process of preparing a water-soluble resinous material which comprises reacting melamine, formaldehyde and the condensation product of ammonia and a difunctional halohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount between about 8 mols and about 20 mols per mol of melamine and the condensation product of ammonia and a difunctional halohydrin is present in an amount to yield between about 1 and about 4 atoms of nitrogen per mol of melamine, and wherein the product produced is infinitely dilutable in neutralized water at a temperature between about 25° C. and 30° C.

8. The process of preparing a water-soluble resinous material which comprises reacting melamine, formaldehyde and the condensation product of a polyalkylene polyamine in a difunctional halohydrin at a temperature between about 20° C. and about 100° C. until a viscosity of between about 20 centipoises and about 800 centipoises measured at 35% solids and 25° C. is obtained, thereafter neutralizing said resinous material, wherein formaldehyde is present in an amount of between about 8 mols and about 20 mols per mol of melamine, wherein said polyamine has a carbon to nitrogen ratio not greater than 4:1, respectively, and the condensation product of a polyalkylene polyamine and a difunctional halohydrin is present in an amount to yield between about 1 and about 4 atoms of nitrogen per mol of melamine, and wherein the product produced is infinitely dilutable in neutralized water at a temperature between about 25° C. and 30° C.

9. The process of preparing a water-soluble resinous material which comprises reacting melamine, formaldehyde and a condensation product of polyalkylene polyamine and dihaloalkane at a temperature between about 20° C. and about 100° C. until a viscosity of between about 20 centipoises and about 800 centipoises measured at 35% solids and 25° C. is obtained, thereafter neutralizing said resinous material, wherein formaldehyde is present in an amount of between about 8 mols and about 20 mols per mol of melamine, wherein said polyamine has a carbon to nitrogen ratio not greater than 4:1, respectively, and the condensation product of polyalkylene polyamine and dihaloalkane is present in an amount to yield between about 1 and about 4 atoms of nitrogen per mol of melamine, and wherein the product produced is infinitely dilutable in neutralized water at a temperature between about 25° C. and 30° C.

10. The process of preparing a water-soluble resinous material which comprises reacting melamine, formaldehyde and the condensation product of ammonia and dihalohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine and the condensation product of ammonia and a dihalohydrin is present in an amount to yield between about 0.5 and about 10 atoms of nitrogen per mol of melamine, and wherein the product produced is infinitely dilutable in neutralized water at a temperature between about 25° C. and 30° C.

11. The process of preparing a water-soluble resinous material which comprises reacting melamine, formaldehyde and the condensation product of ammonia and epihalohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount between about 8 mols and about 20 mols per mol of melamine and the condensation product of ammonia and epihalohydrin is present in an amount to yield between about 1 and about 4 atoms of nitrogen per mol of melamine, and wherein the product produced is infinitely dilutable in neutralized water at a temperature between about 25° C. and 30° C.

12. The process of preparing a water-soluble resinous material which comprises reacting melamine, formaldehyde and the condensation product of polyalkylene polyamine and epihalohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount between about 8 mols and about 20 mols per mol of melamine, wherein said polyamine has a carbon to nitrogen ratio not greater than 4:1, respectively, and the condensation product of polyalkylene polyamine and epihalohydrin is present in an amount to yield between about 1 and about 4 atoms of nitrogen per mol of melamine, and wherein the product produced is infinitely dilutable in neutralized water at a temperature between about 25° C. and 30° C.

13. The process of preparing a water-soluble resinous material which comprises reacting melamine, formaldehyde and the condensation product of polyalkylene polyamine and dihalohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount between about 8 mols and about 20 mols per mol of melamine, wherein said polyamine has a carbon to nitrogen ratio not greater than 4:1, respectively, and the condensation product of polyalkylene polyamine and dihalohydrin is present in an amount to yield between about 1 and about 4 atoms of nitrogen per mol of melamine, and wherein the product produced is infinitely dilutable in neutralized water at a temperature between about 25° C. and 30° C.

14. The process of preparing a water-soluble resinous material which comprises reacting melamine, formaldehyde and the condensation product of ammonia and dichlorohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount between about 8 mols and about 20 mols per mol of melamine and the condensation product of ammonia and dichlorohydrin is present in an amount to yield between about 1 and about 4 atoms of nitrogen per mol of melamine, and wherein the product produced is infinitely dilutable in neutralized water at a temperature between about 25° C. and 30° C.

15. The process of preparing a water-soluble resinous material which comprises reacting melamine, formaldehyde and the condensation product of ammonia and epichlorohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount between about 8 mols and about 20 mols per mol of melamine and the condensation product of ammonia and epichlorohydrin is present in an amount to yield between about 1 and about 4 atoms of nitrogen per mol of melamine, and wherein the product produced is infinitely dilutable in neutralized water at a temperature between about 25° C. and 30° C.

16. The process of preparing a water-soluble resinous material which comprises reacting melamine, formaldehyde and the condensation product of triethylene tetramine and dichlorohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount between about 8 mols and about 20 mols per mol of melamine and the condensation product of triethylene tetramine and dichlorohydrin is present in an amount to yield between about 1 and about 4 atoms of nitrogen per mol of melamine, and wherein the product produced is infinitely dilutable in neutralized water at a temperature between about 25° C. and 30° C.

17. The process of preparing a water-soluble resinous material which comprises reacting melamine, formaldehyde and the condensation product of triethylene tetramine and epichlorohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount between about 8 mols and about 20 mols per mol of melamine and the condensation product of triethylene tetramine and epichlorohydrin is present in an amount to yield between about 1 and about 4 atoms of nitrogen per mol of melamine, and wherein the product produced is infinitely dilutable in neutralized water at a temperature between about 25° C. and 30° C.

18. A water-soluble resin obtained by the process of claim 2.

19. A water-soluble resin obtained by the process of claim 3.

20. The process of preparing a water soluble resinous material which comprises reacting melamine, formaldehyde, and the condensation product of 3,3'-iminobispropylamine and epichlorohydrin at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine, wherein the condensation product of 3,3'-iminobispropylamine and epichlorohydrin is present in an amount sufficient to yield between about 0.5 and about 10 atoms of nitrogen per mol of melamine and wherein the product produced is infinitely dilutable in neutralized water at a temperature between about 25° C. and 30° C.

21. A water soluble resin obtained by the process of claim 20.

References Cited in the file of this patent

UNITED STATES PATENTS

| | | |
|---|---|---|
| 2,334,545 | D'Alelio | Nov. 16, 1943 |
| 2,388,235 | Bowman | Nov. 6, 1945 |
| 2,407,599 | Auten | Sept. 10, 1946 |
| 2,554,475 | Suen | May 22, 1951 |
| 2,601,598 | Daniel | June 24, 1952 |
| 2,616,874 | Yost | Nov. 4, 1952 |
| 2,632,700 | Niles | Mar. 24, 1953 |
| 2,696,504 | Yost et al. | Dec. 7, 1954 |
| 2,699,435 | Auten et al. | Jan. 11, 1955 |

FOREIGN PATENTS

| | | |
|---|---|---|
| 663,736 | Great Britain | Dec. 27, 1951 |

OTHER REFERENCES

Auten: Paper Trade Journal, vol. 127, No. 5, pages 45–51, July 29, 1948.